(12) United States Patent
Tran et al.

(10) Patent No.: US 12,445,289 B2
(45) Date of Patent: Oct. 14, 2025

(54) SYSTEMS AND METHODS FOR SHARED DEVICE ACCESS CONTROL

(71) Applicant: Samsung Electronics Co., Ltd., Suwon-si (KR)

(72) Inventors: Chu Ly Tran, San Jose, CA (US); Xun Chen, Freemont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 844 days.

(21) Appl. No.: 17/591,430

(22) Filed: Feb. 2, 2022

(65) Prior Publication Data

US 2022/0400012 A1    Dec. 15, 2022

Related U.S. Application Data

(60) Provisional application No. 63/210,219, filed on Jun. 14, 2021.

(51) Int. Cl.
*H04L 9/32* (2006.01)
*H04L 9/08* (2006.01)
*H04L 9/40* (2022.01)

(52) U.S. Cl.
CPC .......... *H04L 9/3236* (2013.01); *H04L 9/0833* (2013.01); *H04L 63/0861* (2013.01); *H04L 63/104* (2013.01)

(58) Field of Classification Search
CPC . H04L 9/3236; H04L 9/0833; H04L 63/0861; H04L 63/104
See application file for complete search history.

(56) References Cited

U.S. PATENT DOCUMENTS 9,171,268 B1 * 10/2015 Penilla ..................... B60L 1/06
10,447,681 B2    10/2019 Sajja et al.
(Continued)

FOREIGN PATENT DOCUMENTS

JP         2019-165474 A    9/2016
KR    10-2012-0080410 A    7/2012
(Continued)

OTHER PUBLICATIONS

Supplementary European Search Report dated Jul. 4, 2024 in connection with European Patent Application No. 22825144.3, 10 pages.
(Continued)

*Primary Examiner* — Shanto Abedin

(57) ABSTRACT

A method includes receiving, at an electronic device and from a second electronic device, a second root identifier, wherein the second root identifier is associated with a second profile tree maintained at the second electronic device and determining that a first root identifier does not match the second root identifier, wherein the first root identifier is based on a first profile tree maintained at the electronic device. The method further includes sending, to the second electronic device, the first profile tree, wherein the first profile tree comprises representation of currently maintained user profiles at the electronic device, receiving, from the second electronic device, user profile update information, and updating a subset of the currently maintained user profiles based on the user profile update information.

20 Claims, 13 Drawing Sheets

(56) References Cited

U.S. PATENT DOCUMENTS

| | | | |
|---|---|---|---|
| 10,855,686 B2 | 12/2020 | Shah | |
| 2002/0166119 A1* | 11/2002 | Cristofalo | H04N 21/23109 |
| | | | 725/35 |
| 2003/0125057 A1 | 7/2003 | Pesola | |
| 2005/0226224 A1* | 10/2005 | Lee | H04L 12/282 |
| | | | 370/352 |
| 2006/0161783 A1 | 7/2006 | Aiken et al. | |
| 2006/0256734 A1 | 11/2006 | Erhart et al. | |
| 2009/0133069 A1* | 5/2009 | Conness | H04N 21/4532 |
| | | | 725/46 |
| 2009/0210898 A1* | 8/2009 | Childress | H04H 60/66 |
| | | | 455/418 |
| 2012/0023157 A1 | 1/2012 | Roth et al. | |
| 2012/0177067 A1 | 7/2012 | Cho et al. | |
| 2015/0082024 A1 | 3/2015 | Smith | |
| 2015/0120837 A1 | 4/2015 | Chi | |
| 2016/0344550 A1* | 11/2016 | Anton | H04L 9/3236 |
| 2017/0374548 A1* | 12/2017 | Mason | H04L 63/062 |
| 2018/0285463 A1* | 10/2018 | Choi | G06F 16/9535 |
| 2019/0334724 A1* | 10/2019 | Anton | G06F 16/9535 |
| 2020/0050796 A1 | 2/2020 | Lacey et al. | |
| 2020/0403808 A1 | 12/2020 | Smith et al. | |
| 2021/0014670 A1* | 1/2021 | Li | H04W 12/06 |
| 2021/0103449 A1* | 4/2021 | Terpstra | H04L 63/102 |
| 2021/0136193 A1 | 5/2021 | Mun et al. | |

FOREIGN PATENT DOCUMENTS

| | | |
|---|---|---|
| WO | 2018038914 A1 | 3/2018 |
| WO | 2021031130 A1 | 2/2021 |

OTHER PUBLICATIONS

International Search Report and Written Opinion of the International Searching Authority regarding International Patent Application No. PCT/KR2022/00547 dated Jul. 28, 2022, 8 pages.

* cited by examiner

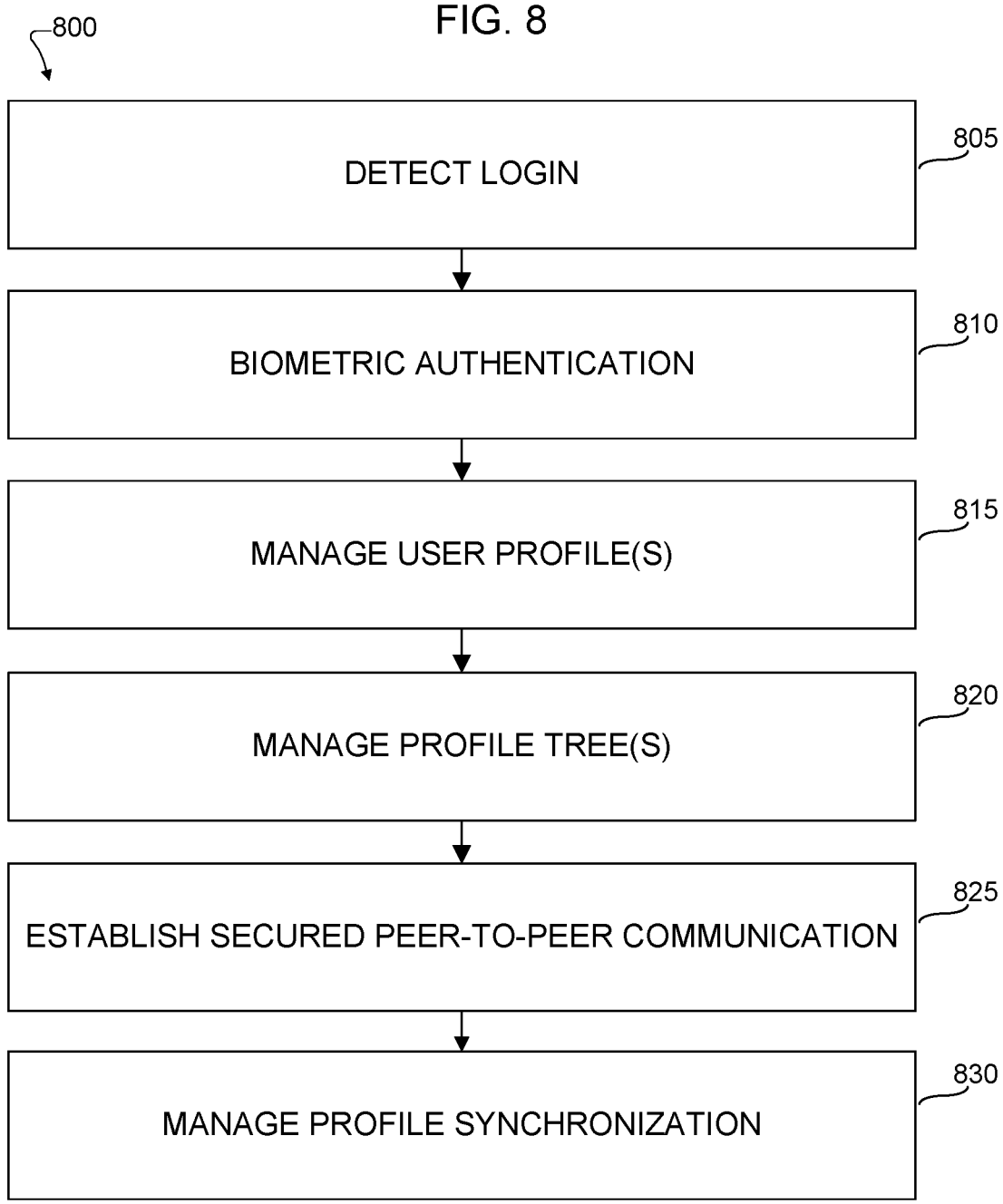

SYSTEMS AND METHODS FOR SHARED DEVICE ACCESS CONTROL

CROSS-REFERENCE TO RELATED APPLICATION AND CLAIM OF PRIORITY

This application claims priority under 35 U.S.C. § 119(e) to U.S. Provisional Patent Application No. 63/210,219 filed on Jun. 14, 2021. The above-identified provisional patent application is hereby incorporated by reference in its entirety.

TECHNICAL FIELD

The present disclosure relates generally to network security and provisioning user profiles across devices. More specifically, the present disclosure relates to systems and methods for shared device access control.

BACKGROUND

Networked mobile computing devices, including smartphones and tablets, have, in addition to their widespread adoption for personal use as communication and computing devices, also become a major productivity tool in the workplace, with employers provisioning their employees with electronic devices. While historically, employers may have provisioned each employee with a dedicated (i.e., one employee-user per device) device, there has been a general push, in particular, in industries characterized by shift work or significant employee turnover (for example, the retail and hospitality industries) towards a shared device paradigm. Under such a paradigm, an employee takes an available device at the beginning of her shift, logs into the device, uses the device during her shift, logs off of from the device, and returns the device to an equipment pool, to be used by one her colleagues in a subsequent shift. According to the shared device paradigm, there is no expectation or requirement that the user will use the same device on a subsequent shift. Thus, in a shared-device paradigm, user profile data needs to be maintained and synchronized across the pool of shared user devices.

In addition to the above-described push towards a shared-device paradigm in the workplace, there has also been a move away from password-based user authentication towards biometric authentication. The shortcomings of passwords as an authentication mechanism are well-understood and include, without limitation, predictability (for example, many opt for passwords based on their birthday), recollection problems (i.e., many users find it difficult to more than a few passwords, resulting in either forgotten passwords, or reuse of the same password across multiple applications), and length issues (for example, most users cannot remember alphanumeric strings above a threshold length). Biometric-based authentication methods (for example, authenticating a user based on image data presented to the device's camera, or data collected from a fingerprint reader) addresses many of the deficiencies of password-based authentication, but introduces new challenges with regard to ensuring the security of the authentication information. Unlike a password, a user's fingerprint or facial signature cannot be changed if this data is compromised.

In view of the above, integrating biometric authentication in the context of a shared-device paradigm present new and unique challenges and opportunities for improvements in the domains of device security and device-to-device synchronization.

SUMMARY

This disclosure provides methods and apparatus for systems and methods for shared device access control.

In one embodiment, a method includes receiving, at an electronic device and from a second electronic device, a second root identifier, wherein the second root identifier is associated with a second profile tree maintained at the second electronic device and determining that a first root identifier does not match the second root identifier, wherein the first root identifier is based on a first profile tree maintained at the electronic device. The method further includes sending, to the second electronic device, the first profile tree, wherein the first profile tree comprises representation of currently maintained user profiles at the electronic device, receiving, from the second electronic device, user profile update information, and updating a subset of the currently maintained user profiles based on the user profile update information.

In another embodiment, an electronic device includes a communication interface and a processor. The processor is configured to receive, via the communication interface, from a second electronic device, a second root identifier, wherein the second root identifier is associated with a second profile tree maintained at the second electronic device, determine that a first root identifier does not match the second root identifier, wherein the first root identifier is based on a first profile tree maintained at the electronic device, send, to the second electronic device, the first profile tree, wherein the first profile tree comprises representation of currently maintained user profiles at the electronic device, receive, from the second electronic device, user profile update information, and update a subset of the currently maintained user profiles based on the user profile update information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates operations of an example method for synchronizing shared device access controls, according to various embodiments of this disclosure;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
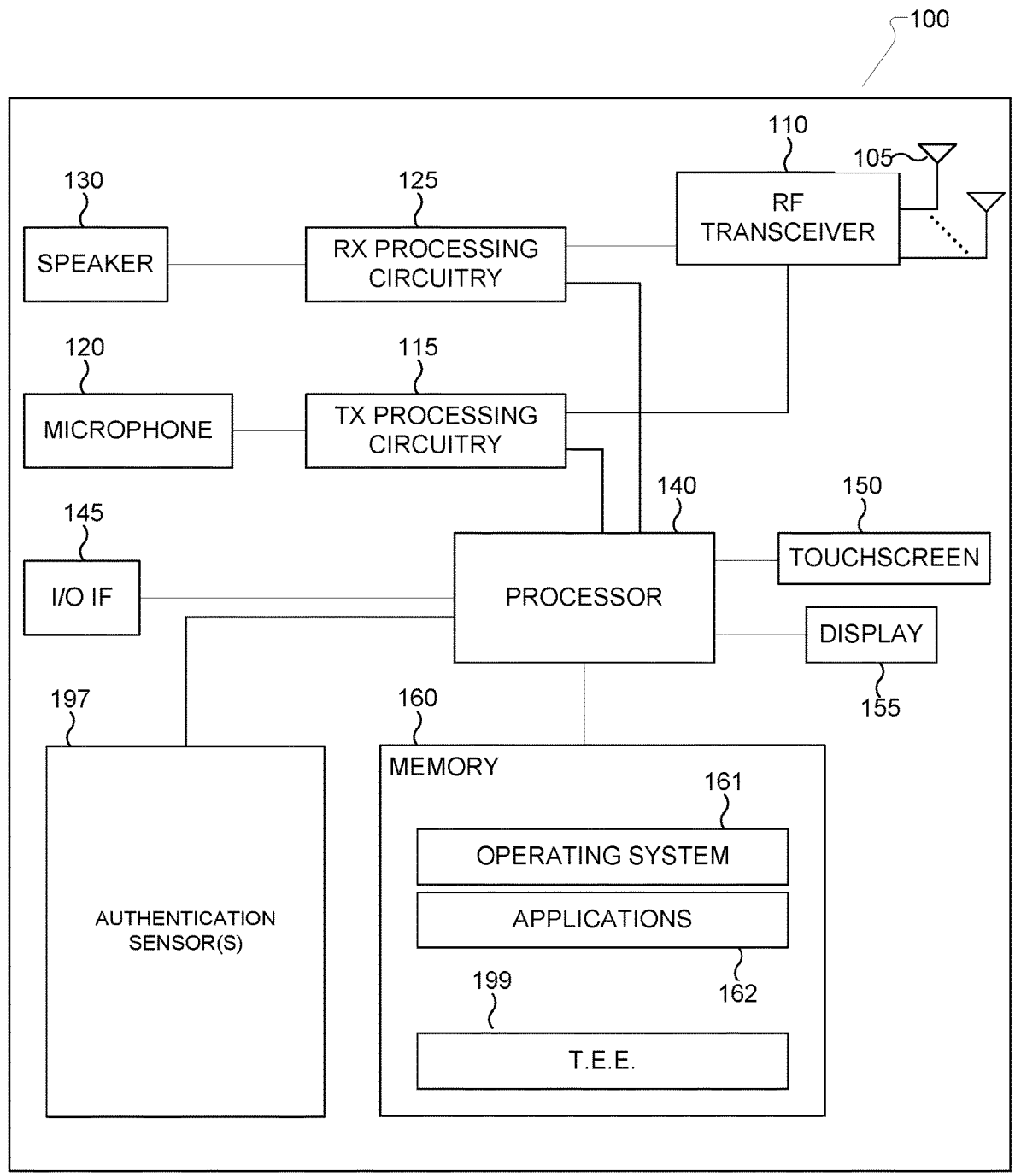
FIG. 1 illustrates an example of an electronic device, according to various embodiments of this disclosure.

FIG. 1 illustrates an example of an electronic device 100 according to this disclosure. The embodiment of the electronic device 100 is for illustration. However, electronic devices come in a wide variety of configurations, and FIG. 1 does not limit the scope of this disclosure to any particular implementation of an electronic device.

As shown in FIG. 1, the electronic device 100 includes an antenna 105, a radio frequency (RF) transceiver 110, transmit (TX) processing circuitry 115, a microphone 120, and receive (RX) processing circuitry 125. The electronic device 100 also includes a speaker 130, a main processor 140, an input/output (I/O) interface (IF) 145, a touchscreen 150, a display 155, and a memory 160. The memory 160 includes a basic operating system (OS) program 161 and one or more applications 162.

The RF transceiver 110 receives from the antenna 105, an incoming RF signal transmitted by an eNB of a network. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105. According to certain embodiments, TX processing circuitry and RX processing circuitry encode and decode data and signaling for wireless in resource blocks ("RBs" or physical resource blocks "PRBs") which are transmitted and received by, inter alia, the eNBs of a wireless network. Put differently, TX processing circuitry 115 and RX processing circuitry 125 generate and receive RBs which contribute to a measured load at an eNB. Additionally, RX processing circuitry 125 may be configured to measure values of one or more parameters of signals received at electronic device 100.

The main processor 140 can include one or more processors or other processing devices and execute the basic OS program 161 stored in the memory 160 in order to control the overall operation of the electronic device 100. For example, the main processor 140 could control the reception of forward channel signals and the transmission of reverse channel signals by the RF transceiver 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to signals received from eNBs or an operator. The main processor 140 is also coupled to the I/O interface 145, which provides the electronic device 100 with the ability to connect to other devices such as laptop computers and handheld computers. The I/O interface 145 is the communication path between these accessories and the main processor 140. According to various embodiments, device 100 further comprises one or more authentication sensor(s) 197. As used in this disclosure, the expression "authentication sensor" encompasses a sensor which can obtain biometric data (for example, a digital camera, a fingerprint scanner, a retinal scanner, or a voice analyzer) of a user, and provide biometric data to processor 140 and/or trusted execution environment 199 for secure analysis.

The main processor 140 is also coupled to the touchscreen 150 and the display unit 155. The operator of the electronic device 100 can use the touchscreen 150 to enter data into the electronic device 100. The display 155 may be a liquid crystal display or other display capable of rendering text and/or at least limited graphics, such as from web sites.

Figure 11:
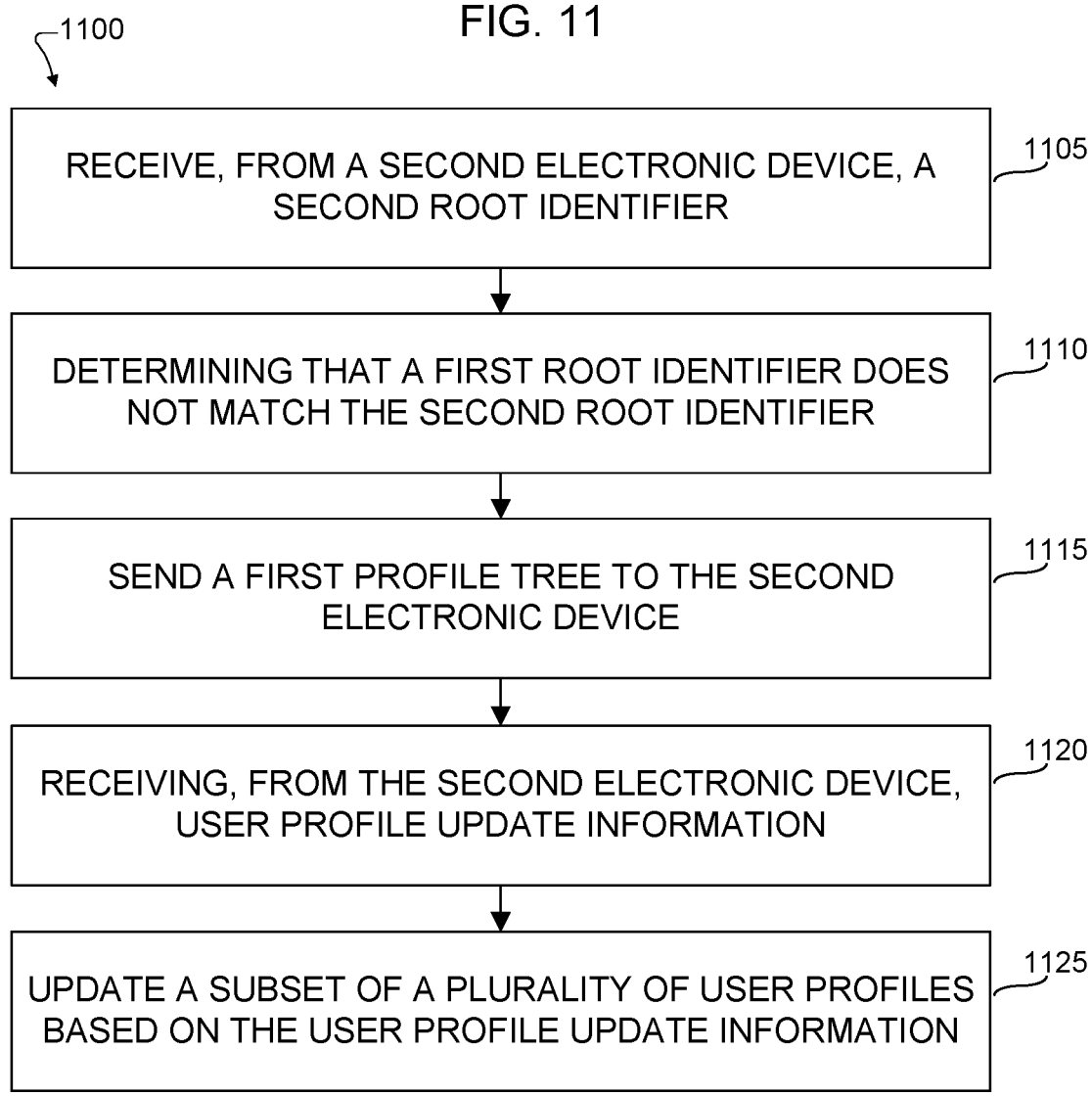
FIG. 11 illustrates an example method for synchronizing user profile data between peer devices of a shared device access group, according to various embodiments of this disclosure.

The memory 160 is coupled to the main processor 140. Part of the memory 160 could include a random-access memory (RAM), and another part of the memory 160 could include a Flash memory or other read-only memory (ROM). As shown in FIG. 11, memory 160 further comprises memory spaces which are logically or physically isolated from processes accessible by the system kernel or framework, and act as memory resources for a trusted execution environment 199. According to various embodiments, trusted execution environment 199 comprises a secure enclave in which sensitive processes (for example, authentication processes and processes associated with payment applications) can execute, while at the same time, being isolated from processes operating elsewhere on device 100.

Although FIG. 1 illustrates one example of electronic device 100, various changes may be made to FIG. 1. For example, various components in FIG. 1 could be combined, further subdivided, or omitted and additional components could be added according to particular needs. As a particular example, the main processor 140 could be divided into multiple processors, such as one or more central processing units (CPUs) and one or more graphics processing units (GPUs). Also, while FIG. 1 illustrates the electronic device 100 configured as a mobile telephone or smartphone, UEs could be configured to operate as other types of mobile or stationary devices.

Figure 2:
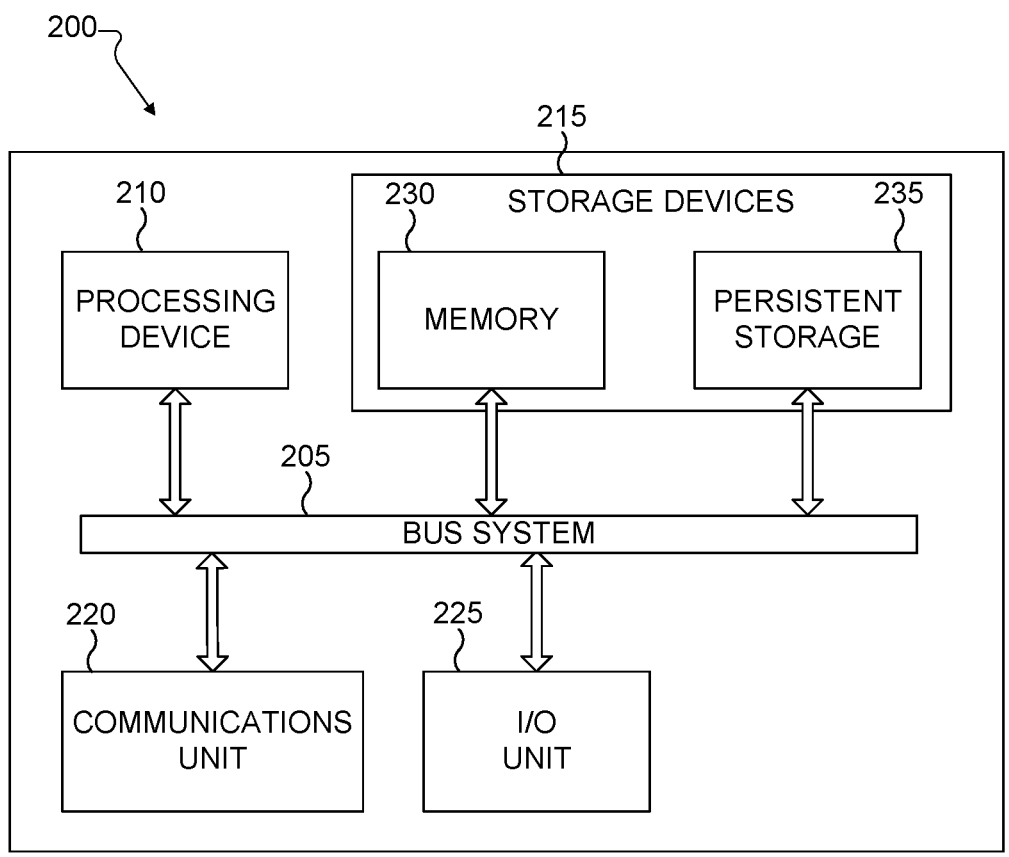
FIG. 2 illustrates an example of a server according to some embodiments of this disclosure.

FIG. 2 illustrates an example of a server 200 according to certain embodiments of this disclosure. Depending on embodiments, server 200 can be implemented as part of a base station. The embodiment of server 200 shown in FIG. 2 is for illustration only and other embodiments could be used without departing from the scope of the present disclosure.

In the example shown in FIG. 2, server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over a network. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device. While server 200 has been described with reference to a standalone device, embodiments according to this disclosure are not so limited, and server 200 could also be embodied in whole, or in part, on a cloud or virtualized computing platform. Additionally, in some embodiments, server 200 may be embodied across multiple computing platforms.

Figure 3:
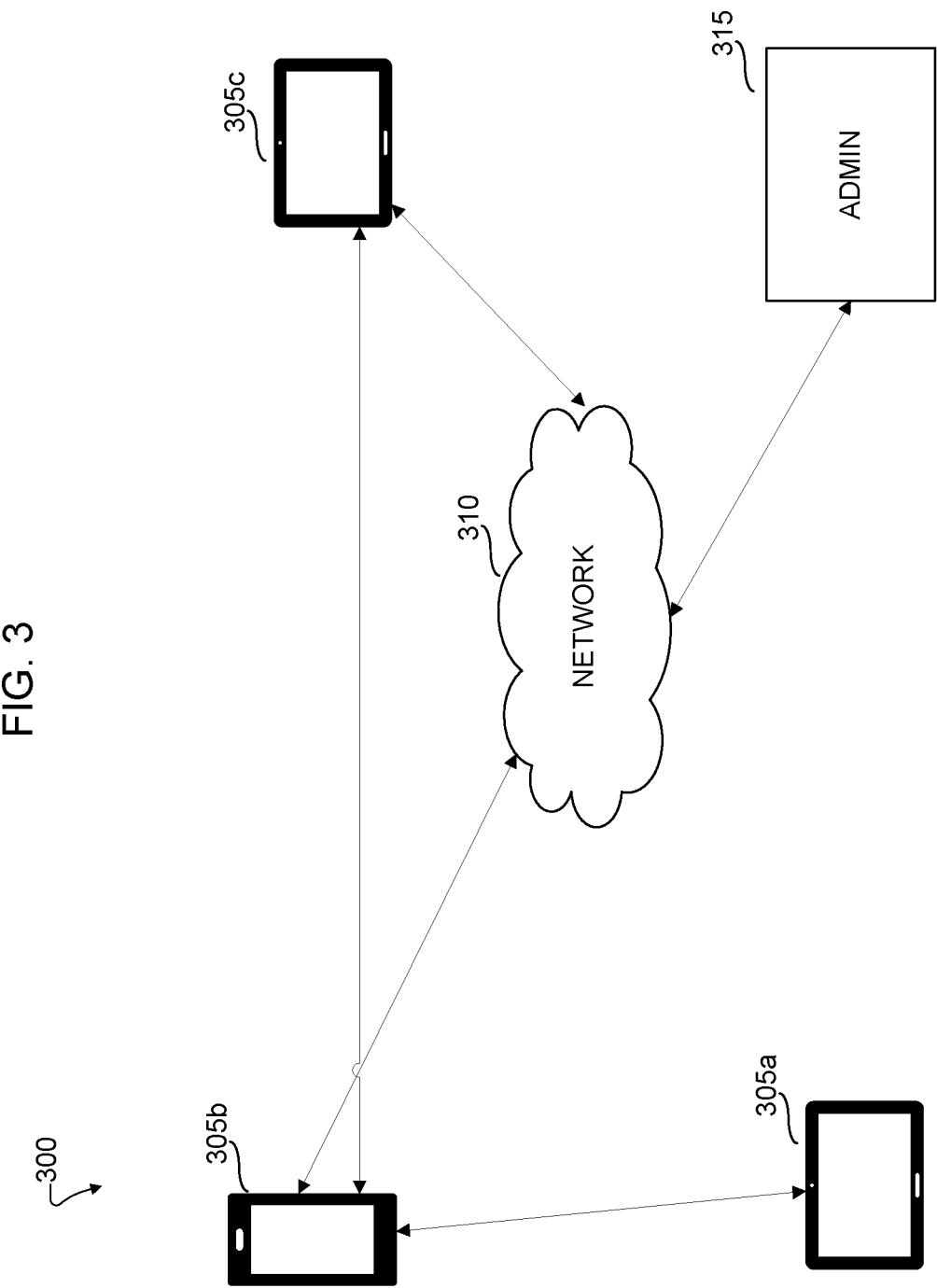
FIG. 3 illustrates an example of a network context according to some embodiments of this disclosure.

FIG. 3 illustrates an example of a network context 300, according to various embodiments of this disclosure. Referring to the illustrative example of FIG. 3, a first shared device 305a, a second shared device 305b, and a third shared device 305c are shown in the figure. Each of shared devices 305a-305c has a processor (for example, processor 140 in FIG. 1), circuitry to support transmission and reception of data according to one or more data transmission protocols (for example, WI-FI® or Bluetooth Low Energy ("BLE")), a memory supporting a trusted execution environment (for example, TEE 199 in FIG. 1), and one or more authentication sensors (for example, authentication sensors 197). Shared devices 305a-305c may be smartphones, tablets, or other networked devices. In this example, each of shared devices 305a-305c allow authorized users to log onto a device and access data and applications maintained in a user profile on the device by performing an authentication operation based on a comparison of biometric data.

In the example of FIG. 3, shared devices 305a-305b are communicatively connected to each other, either directly (for example, through a BLE radio link) or indirectly, through network 310, which may be a publicly available network (for example, the internet) or a proprietary network (for example, an enterprise intranet). As shown in the explanatory example of FIG. 3, a device 315 (for example, an instance of server 200 in FIG. 2) operating as an administrative platform, through which an administrator can monitor aspects of the usage of shared devices 305a-305c, provision additional devices to join shared devices 305a-305c as shared devices, or alternatively, remove electronic devices from the pool of shared devices.

As discussed herein, certain embodiments according to this disclosure provide, without limitation, mechanisms for synchronizing user profiles and biometric authentication data across devices of a shared device pool, while, at the same time, providing visibility on activity at the shared devices without compromising the integrity and security of biometric data of authorized users maintained at the shared devices.

Figure 4:
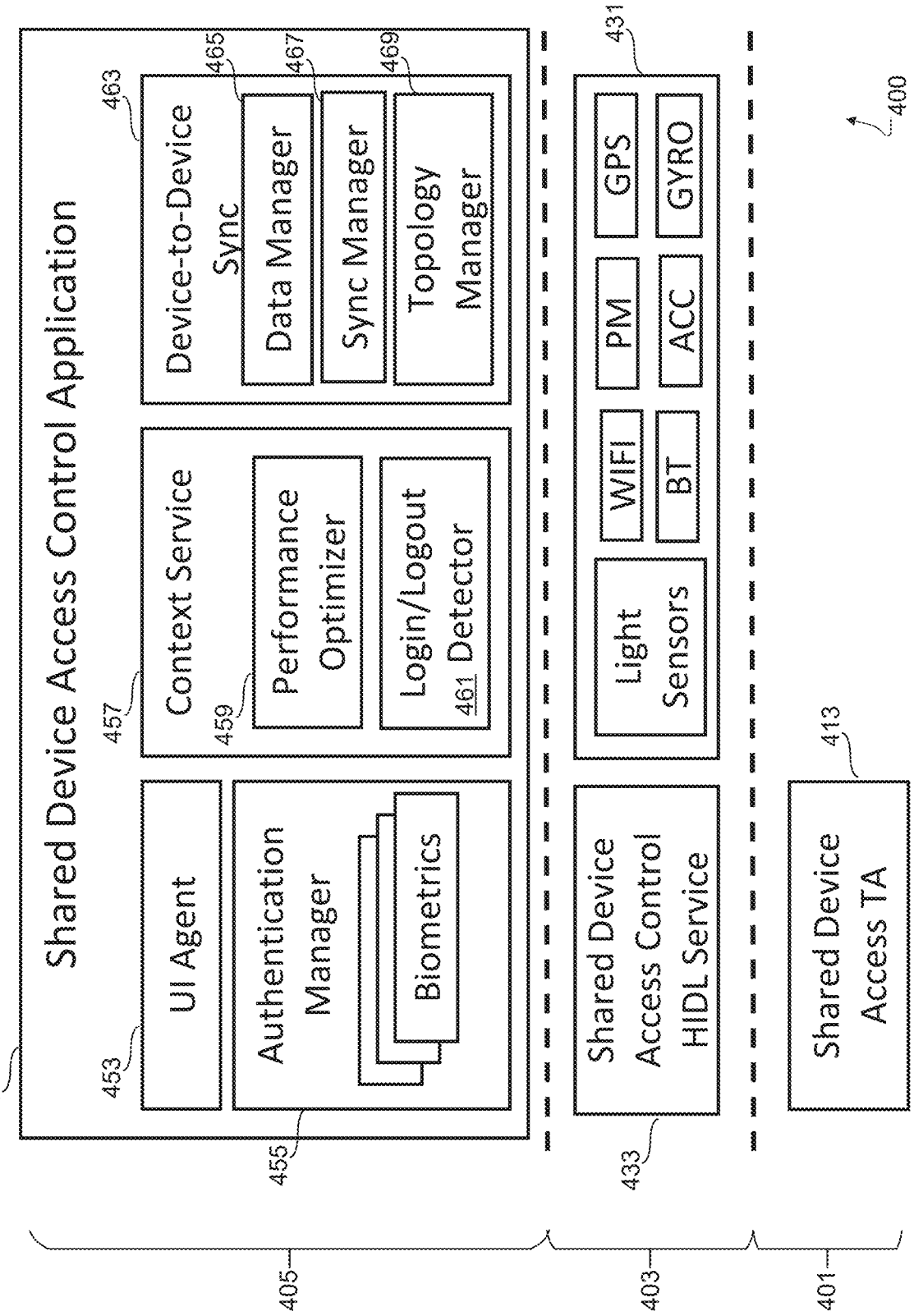
FIG. 4 illustrates an example of a device level architecture for implementing shared device access controls according to various embodiments of this disclosure.

FIG. 4 illustrates an example of a device-level architecture 400 for implementing shared device access controls, according to various embodiments of this disclosure. Architecture 400 can be implemented at any suitably configured processing platform (for example, electronic device 100) which is capable of performing biometric user authentication, implementing a trusted, high-security memory space, and communicating with other devices using one or more wireless protocols.

Referring to the non-limiting example of FIG. 4, architecture 400 comprises three layers, a secure layer 401, a device layer 403, and an application layer 405. According to various embodiments, secure layer 401 comprises an execution environment (for example, the TrustZone in certain ARM® microprocessors) that, through a combination of hardware and software segregating the memory spaces and processing resources of secure layer 401, provides a trusted execution environment where especially sensitive data (for example, biometric data of users in a shared device user pool) can be maintained. In this example, secure layer 401 provides an instance of a shared device authentication application 413, which maintains biometric data of a user and performs user authentication based on a comparison of sensor data provided through device layer 403 against biometric data maintained in secure layer 401. In this way, secure layer 401 keeps biometric data of registered users separate from other applications and processes executing on the device. In this way, malicious actors cannot obtain users' biometric authentication data.

According to certain embodiments, architecture 400 further comprises a device layer 403 (sometimes referred to as a "framework") comprising a suite of drivers 431 by which applications in application layer 405 and secure layer 401 can control and obtain data from hardware components, such as light sensors, motion sensors and manage communication functionalities of the electronic device. In some embodiments, drivers 431 can be accessed via one or more hardware abstraction layers (HAL) defining a standard interface for the hardware resources of the electronic device.

According to some embodiments, device layer 403 further comprises one or more hardware abstraction layer interface definition language ("HIDL") modules which further specifies the HAL through which shared device access control application 451 can access the hardware resources of the device.

Referring to the explanatory example of FIG. 4, application layer 405 contains at least one instance of a shared device access control ("SDAC") application 451, which, without limitation, manages synchronization of user profiles across shared devices of a device group (for example, shared devices 305a-305c in FIG. 3) and initiating and reporting authentication operations among shared devices of the device group (so that a given non-administrator user is not simultaneously logged in on multiple shared devices). According to certain embodiments, SDAC 451 provides a user interface (UI) agent 453, which presents an interface through which a user can log in, and present biometric data (for example, a fingerprint, or a take a photo of their face) for authentication.

As shown in the explanatory example of FIG. 4, SDAC 451 further comprises an authentication manager 455, which in certain embodiments, manages authentication related events and triggering of authentication factors (for example, facial recognition). In this example, authentication manager 455 interfaces with UI agent 451 to perform camera-related activities, such as verifying facial data, and obtaining facial data for enrolling an individual as an authorized user of devices of the shared device group. In some embodiments, upon activating a camera of the electronic device, authentication manager 455 tries to detect a face, and provide facial image data which is passed through device layer 403 to secure layer 401, where application 413 associates the facial image data with user profile data maintained in the secure layer to identify and authenticate an approved user.

In some embodiments, SDAC 451 also includes a context service 457, which comprises a suite of software modules configured to improve the overall performance of the electronic device implementing architecture 400, as well as the overall performance of the group of shared devices of which the device implementing architecture 400 is a part. In this example context service 457 comprises a performance optimizer 459, which is configured to minimize the battery and radio usage associated with synchronization operations. Accordingly, performance optimizer 459 comprises control logic for scheduling synchronization operations and when and how often the electronic device searches for peer devices of the shared device group. Further, and as shown in FIG. 4, context service 457 further comprises a login/logout detector 461, which is configured to detect when a user logs in or out at the device implementing architecture 400, and also when the logged in user at peer devices changes. From a security and synchronization standpoint, having a registered, non-administrator user simultaneously logged in on multiple shared devices is undesirable, as it can create opportunities for malicious use of shared devices, and synchronization errors. Accordingly, login/logout detector 461 is configured to detect login/logout events and trigger reporting of same among peer devices of a shared device group.

As shown in the explanatory example of FIG. 4, SDAC 451 also comprises a device-to-device synchronization manager 463, which manages aspects of synchronizing user profile data at the electronic device implementing architecture 400, as well as peer devices of a group of shared devices. According to certain embodiments, device synchronization manager 463 includes a data manager 465, which is responsible for generating and updating user profile data maintained at the shared user device, as well as for computing compact, unique representations (for example, computing hashes) of the user profile data currently maintained at the user device.

Referring to the non-limiting example of FIG. 4, SDAC 451 may further include a synchronization manager 467, which is configured to perform comparisons of representations of current user profile data maintained at other devices within a shared device group against representations of the currently stored user profile data at the electronic device to identify subsets of user profile data which require updating. Further, in some embodiments, SDAC 451 includes a topology manager 469, for managing onboarding new devices to a shared device group or for propagating messages to remove a device from a shared device group.

While not shown in FIG. 4, in certain embodiments, SDAC 451 further comprises one or more APIs through which an administrator device (for example, device 315 in FIG. 3) can receive data from SDAC 451 (but not from secure layer 401) regarding operations performed through SDAC 451 (for example, the frequency with which synchronization operations are performed, when particular devices were last synchronized, and which users have accessed which devices of a shared device group over a designated reporting interval).

Figure 5:
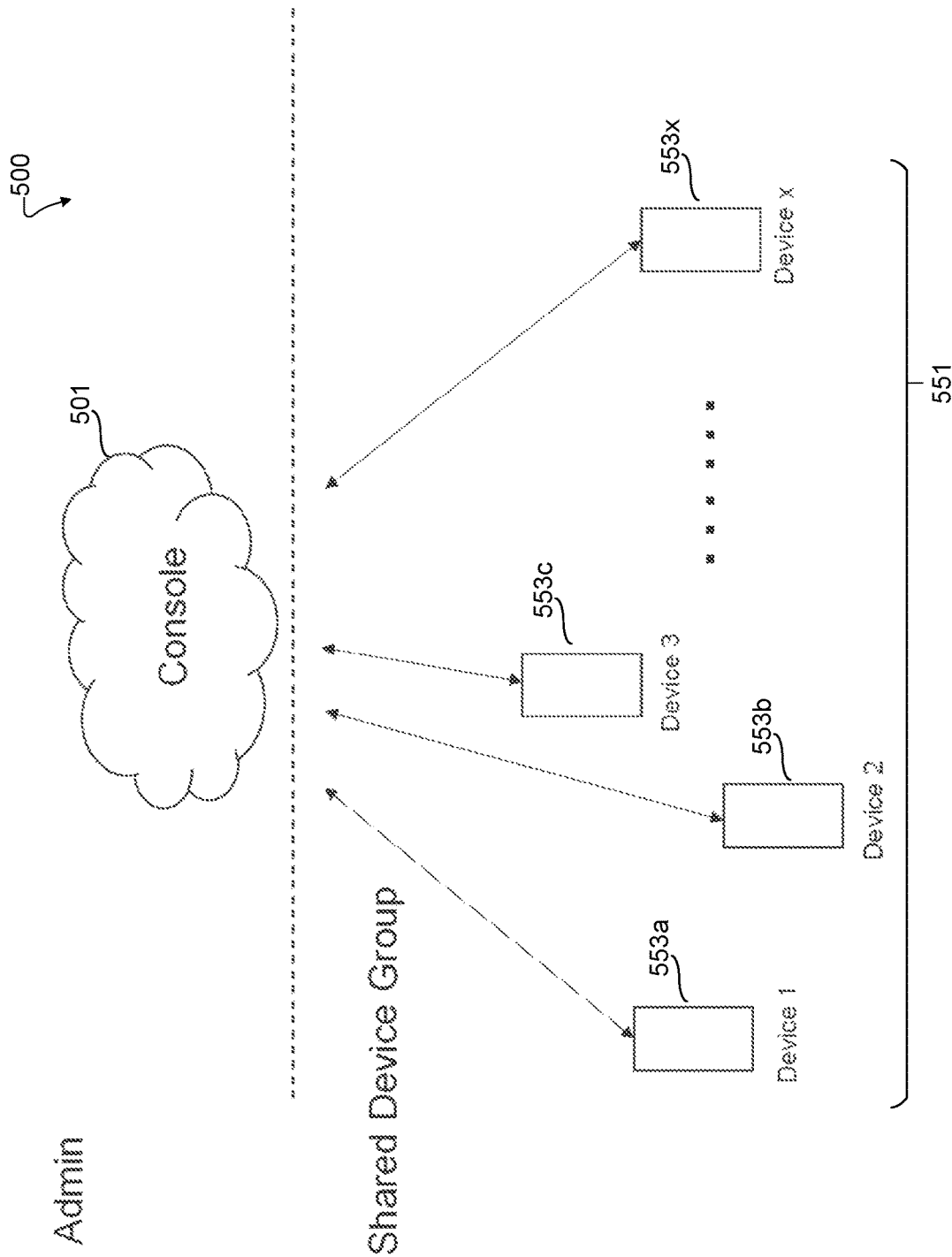
FIG. 5 illustrates an example of an administration architecture for shared device access controls, according to various embodiments of this disclosure.

FIG. 5 illustrates an example of an administration/device group management architecture 500, according to various embodiments of this disclosure. Referring to the illustrative example of FIG. 5, architecture 500 comprises a remote management console 501, and devices 553a-553x of a shared device group 551. In this example, each of devices 553a-553x is configured to implement an instance of a device level architecture (for example, architecture 400 in FIG. 4) for shared device access control and is configured to be used by a set of authorized users, each of whom has biometric authentication data maintained in a secure layer (for example, an instance of secure layer 401 in FIG. 4) of each device in shared device group 551.

As shown in FIG. 5, devices 553a-553x are communicatively connected to remote management console 501. In certain embodiments, remote management console 501 is a dedicated server-side application executing on a physical or cloud server platform. In various embodiments, remote management console 501 is integrated with another server-side application, such as a unified endpoint management (UEM) application. According to various embodiments, the instances of an SDAC (for example, SDAC 451 in FIG. 4) periodically report data and receive management commands from remote management console 501, which provides a dashboard or other user interface through which an administrator can monitor and configure the devices of shared device group 551. Notably, given the multi-layer architecture implemented at the shared devices, devices of shared group 551 are architecturally precluded from reporting data maintained in their respective secure layers (for example, secure layer 401 in FIG. 4) to remote management console 501.

According to various embodiments, the data obtained by and presented through remote management console 501 comprises, per profile metadata of user profiles (for example, user profile 901 in FIG. 9A) maintained at each shared device. The per-profile metadata may include root hash values for profiles maintained at the device, timestamp data (for example, data indicating a last update, last login, last logoff, etc.), credential indices (for example, metadata indicating which users have credentials maintained on a particular device), and metadata identifying devices at which a particular user profile is available. The data obtained by, and reported through, remote management console 501 may further include per device metadata, such as the size of, and number of, user profiles maintained at each device, and timestamps indicating use milestones (for example, the time of the most recent synchronization event). In certain embodiments, remote management console 501 may be configured to manage changing per-user and per-device settings, such as individual user's ability to install new applications or access particular applications (for example, certain employees may not need to access an enterprise's financial applications).

Additionally, in certain embodiments, remote device management console 501 can be configured to control (for example, through an API provided in the SDAC on each shared device) aspects of the device's operation. For example, remote device management console 501 may be able to push out, over a network, a command to perform a forced logout of the current user on a shared device. In some embodiments, remote device management console 501 may be able to push out, over the network, a command to delete a user profile on a shared device or set of shared devices, thereby causing the deletion of the user profile across all of the devices of shared device group 551 as a result of device-to-device synchronization. In certain embodiments, remote device management console 501, may push out commands to one or more devices to suspend device-to-device synchronization, in order to conserve resources, or perform administrative tasks at the one or more devices.

Figure 6:
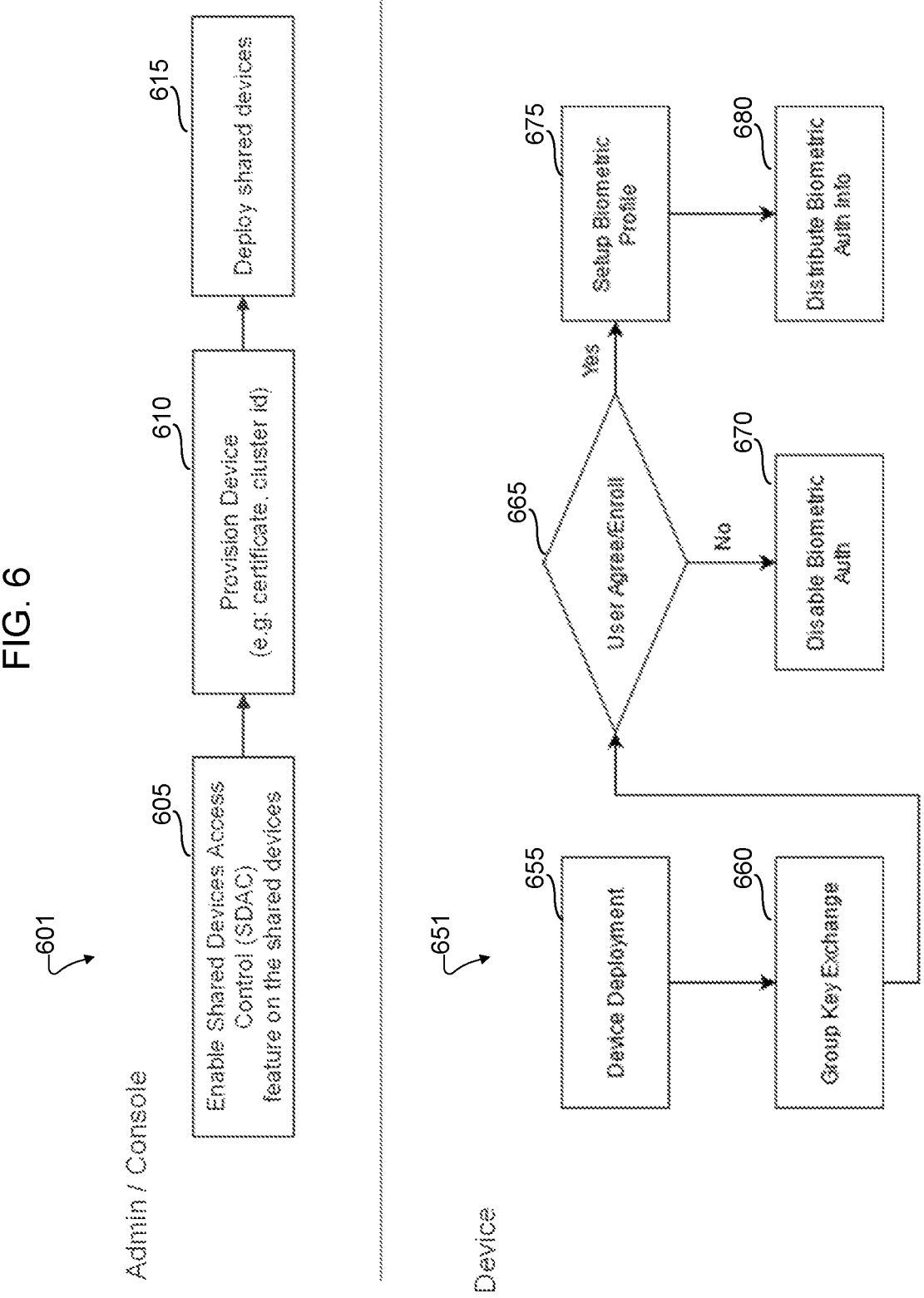
FIG. 6 illustrates an example of methods for initializing a shared device group, according to certain embodiments of this disclosure.

FIG. 6 illustrates an example of a method 601 of performed at a remote device management console (for example, remote device management console 501 in FIG. 5) and an example of a method 651 at an electronic device (for example, electronic device 100 in FIG. 1 or shared device 553a in FIG. 5) for initial setup and deployment of shared device access controls, according to various embodiments of this disclosure.

In certain embodiments according to this disclosure, at operation 605 a computing platform operating as an administrator platform (for example, console 501 in FIG. 5) installs and activates an instance of an SDAC application (for example, SDAC 451 in FIG. 4) on each device to be added to a shared device group. At operation 605, where shared device access control is a configurable feature (i.e., it can be enabled or disabled), the administrator platform pushes out, to each device to form a shared device group, a command enabling shared device access controls.

Referring to the explanatory example of FIG. 6, at operation 610, the console provisions each device of the nascent shared device group with a unique (to the shared group) identifier (for example, an alphanumeric string) of the shared group, and a certificate or other secret token, which the devices of the forming shared device group can use to establish a group key for establishing trusted peer-to-peer connections for synchronization. Notably, in certain embodiments according to this disclosure, the group key is maintained in a secure layer (for example, secure layer 401 in FIG. 4), and is thus, not accessible to devices or processes outside of an electronic device. In this way, establishing a shared device group does not compromise the security of sensitive biometric data maintained at each device of the shared device group.

According to various embodiments, at operation 615, the administrator platform deploys the shared devices, which in the context of this example, comprises initiating a process of device discovery and group key exchange to facilitate synchronization between devices. In other words, at operation 615, the administrator platform "hands off" the process of configuring the shared device network to the devices provisioned with the common certificate and cluster ID at operation 610.

According to various embodiments, following deployment by an administrator platform at operation 651, each device which received the group ID and certificate performs one or more iterations of operation 651 to complete establishment of the shared device group. Referring to the illustrative example of FIG. 6, at operation 655, once deployment begins, each device of the shared device group generates a group key, which, in certain embodiments, is a cryptographic transform (for example, a hash based, at least in part, on the certificate and cluster ID provided at operation 610) which, by virtue of the limited circulation of the certificate and cluster id, can only be known to the devices of the shared device group. Notably, in some embodiments, the transformation of the certificate at operation 655 precludes the administrator platform from knowing the group key for the shared device group. Once generated, each device's group key is maintained in a secure layer (for example, secure layer 401 in FIG. 4) of the device, further precluding access by unauthorized devices or processes. According to certain embodiments, the group key generated at operation 655 may comprise a public-private key pair, with a public key for exchange with other shared devices as a trustworthy indicia of a device's membership in a shared device group.

Referring to the explanatory example of FIG. 6, at operation 660, a first device detects a second device, for example, by receiving a radio signal containing the group ID provisioned at operation 610, as a possible member of the shared device group. Further, at operation 660, the first and second devices exchange data encrypted by the public key portions of their group keys to authenticate one another as members of a group of devices provided with the root secret at operation 610. Once authenticated, the first device proceeds to operation 665, by presenting a user interface (for example, a user interface managed by UI Agent 453 in FIG. 4) to see if the currently logged user of the electronic device agrees to provide his biometric data as part of a user profile to be maintained and synchronized across devices of the shared device group. Where a user does not agree to provide their biometric information as part of a user profile, operation proceeds to 670, and, depending on the configuration of the SDAC, the user may not be enrolled as a user of devices of the shared device group, or alternatively, a user profile without biometric data is created for the user.

According to some embodiments, where the currently logged in user agrees to provide biometric data for a user profile, method 651 proceeds to operation 675, wherein one or more processes of an SDAC application (for example, authentication manager 455 and data manager 465 in FIG. 4) on the electronic device collects biometric data of the user (for example, one or more facial photographs or fingerprints) and generates a user profile comprising the biometric data or a representation thereof.

As shown in FIG. 6, once a user profile with biometric data has been established at operation 675, method 651 proceeds to operation 680, wherein the biometric data is encrypted with the group key of the shared device group and distributed to other devices in the shared device group, as part of a synchronization operation.

Figure 7:
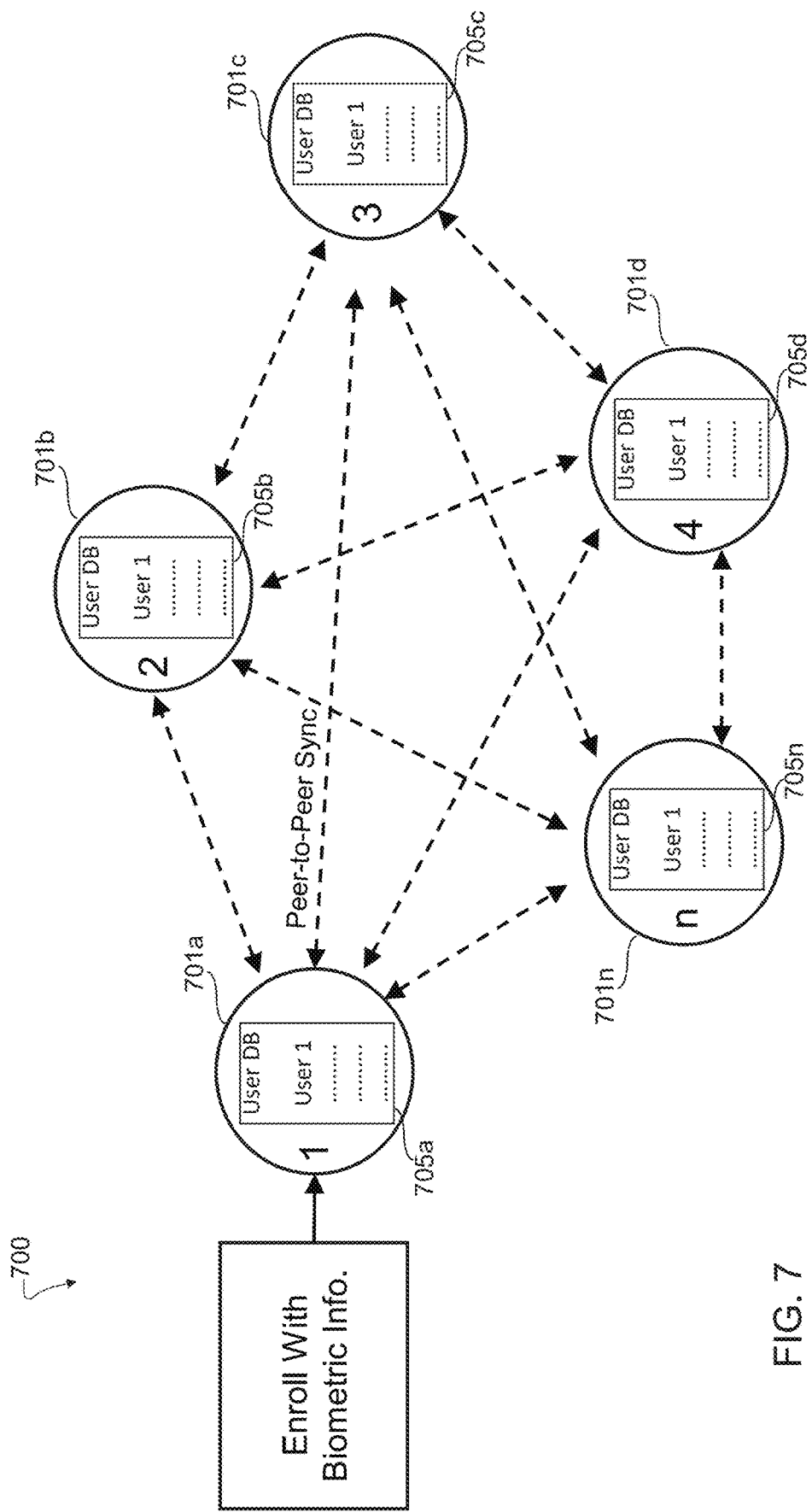
FIG. 7 illustrates aspects of peer-to-peer user profile data synchronization, according to various embodiments of this disclosure.

FIG. 7 illustrates aspects of synchronization of user profile data via secured peer-to-peer communication, according to various embodiments of this disclosure. Referring to the illustrative example of FIG. 7, a representation of a shared device group 700 comprising n devices, where n is an arbitrary integer greater than one. In contrast to shared device architectures employing a client-server architecture for synchronization and authentication, embodiments according to the present disclosure employ a decentralized architecture, which eliminates a centralized server as a single point of system failure.

Referring to the explanatory example of FIG. 7, where a first user enrolls as a user of shared device group 700 at first device 701*a*, a user profile associated with the first user is created and added to a first instance of a user database 705*a* maintained at first device 705*a*. In this example, the devices of shared device group 700 are communicatively connected to one another by short-range communication protocols (for example, BLE or ZIGBEE) or by network communication protocols. Accordingly, in certain embodiments of this disclosure, devices of shared device group 700 can discover one another, authenticate each other as members of shared device group 700 (for example, by authenticating each other using instances of the group key generated at operation 655 in FIG. 6), establish a secure peer-to-peer connection over which they can exchange representations of the user profile data maintained at each device, and synchronize the user profile data between instances of the user profile database maintained across the devices of shared device group 700.

By regularly iterating a synchronization process between devices 701*a*-701*n* of shared device group, each of the n instances 705*a*-705*n* of the user profile database can be made consistent with one another, while at the same time, the integrity of the system is enhanced, in that there is no single point of failure. For example, if second device 701*b* were to be accidentally destroyed, at worst, the data loss would be limited to updates to second instance 705*b* of the user profile database made over the interval between the last synchronization event and the destruction of the device. As such, certain embodiments according to this disclosure provide a robust and secure architecture for storing user profile data.

FIG. 8 illustrates operations of an example method 800 for performing shared device access controls at a networked electronic device (for example, electronic device 100 in FIG. 1, or first device 701*a* in FIG. 7) implementing an architecture (for example, architecture 400 in FIG. 4) comprising an SDAC application and a secure layer in which biometric user profile data and encryption keys may be stored.

Referring to the explanatory example of FIG. 8, at operation 805, one or more components (for example, UI agent 451 and authentication manager 455 in FIG. 4) of an SDAC executing on a device of a shared device group detects a user trying to log on to the device. Responsive to detecting a login event at operation 805, at operation 810, the electronic device performs biometric authentication of the user by obtaining biometric data (for example, through commands passed from the SDAC through a device layer (for example, device layer 403 in FIG. 4) from one or more sensors of the electronic device and passing the biometric data to an authentication application (for example, application 413 in FIG. 4) executing in the secure layer. The authentication application compares the obtained biometric data against biometric profile credentials maintained in the secure layer to determine whether the received biometric data is associated with an enrolled user, or whether a new user needs to be enrolled.

As shown in the explanatory example of FIG. 8, at operation 815, the SDAC manages the user profile associated with the user. Where, at operation 810, the biometric authentication data obtained from the user matches biometric authentication credentials of the user, managing the user profile of the recognized user comprises launching a set of applications according to data maintained in the user's profile. In some embodiments, this includes logging into applications based on password or other authentication data associated with the recognized user. In certain embodiments, managing the user profile comprises presenting a set of files or documents on a user interface of the device, which the user profile has indicated comprise the working documents of the registered user.

According to some embodiments, where, at operation 810, the biometric authentication data obtained from the user does not match any of the biometric authentication credentials of the user, managing the user profile at operation 815 may comprise enrolling the user as an allowed user of devices of the shared device group, for example, by requiring the new user to present appropriate password credentials, obtaining biometric data of the new user and creating a new user profile associated with the new user's biometric credentials. In certain embodiments, in addition to being stored in a secure layer provided by the shared electronic device, the biometric credentials may further be encrypted, to enhance security.

As shown in the explanatory example of FIG. 8, at operation 820, the SDAC manages the profile trees maintained at the electronic device. As discussed with reference to the illustrative examples of FIGS. 9A-9B and 10B herein, in certain embodiments, devices of a shared device group exchange hierarchical representations of the user profile data maintained at the device to first determine whether the devices contain matching user profile data across all of the user profiles maintained at each device, and to second, identify the specific user profiles with divergent user profile data, so that synchronizing the two devices requires only updating the user profiles with out-of-sync data. To facilitate determining whether the user profile data is consistent across devices, at operation 820, the SDAC or a module thereof (for example, data manager 465 in FIG. 4) generates one or more Merkle trees, which provide a compact representation of the current user profile data maintained at the device, which can be efficiently exchanged between devices and rapidly compared.

According to various embodiments, at operation 825, the electronic device establishes a secured peer-to-peer communication link with a peer device of the shared device group. According to various embodiments, establishing the secured peer-to-peer communication link comprises receiving data from the peer device which has been encrypted with the group key of the shared device, and which, when successfully decrypted by an instance of the group key at the electronic device, confirms that the peer device is a trustworthy device with the same encryption key.

According to various embodiments, at operation 825, the first and second devices exchange one or more representations of the user profile data at each the respective devices (for example, the Merkle root of each device's profile tree.

As shown in the non-limiting example of FIG. 8, at operation 830, the electronic device performs a comparison of the representation(s) of user data received from the peer device to determine if (and where) there are any discrepancies between the user profile data maintained at the electronic device and the user profile data at the peer device. According to some embodiments, operation 830 is performed according to a hierarchical comparison of the nodes of each device's Merkle trees. Where the root nodes match, the user profile data at both devices is in sync, and no further synchronization is required.

Figure 9A:
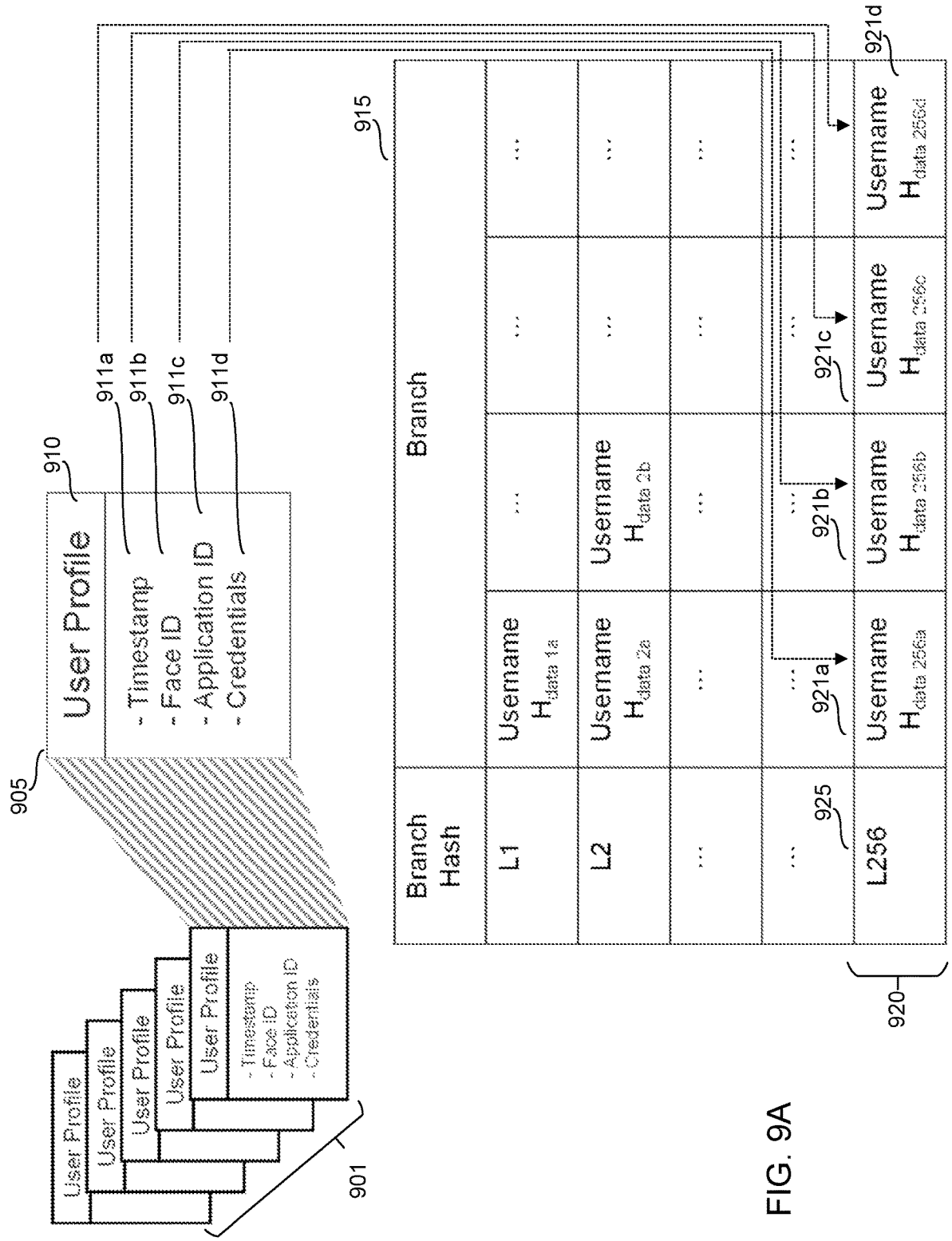
FIGS. 9A and 9B illustrate an example of user profile data structures and representations of a user profile database, according to certain embodiments of this disclosure.
Figure 9B:
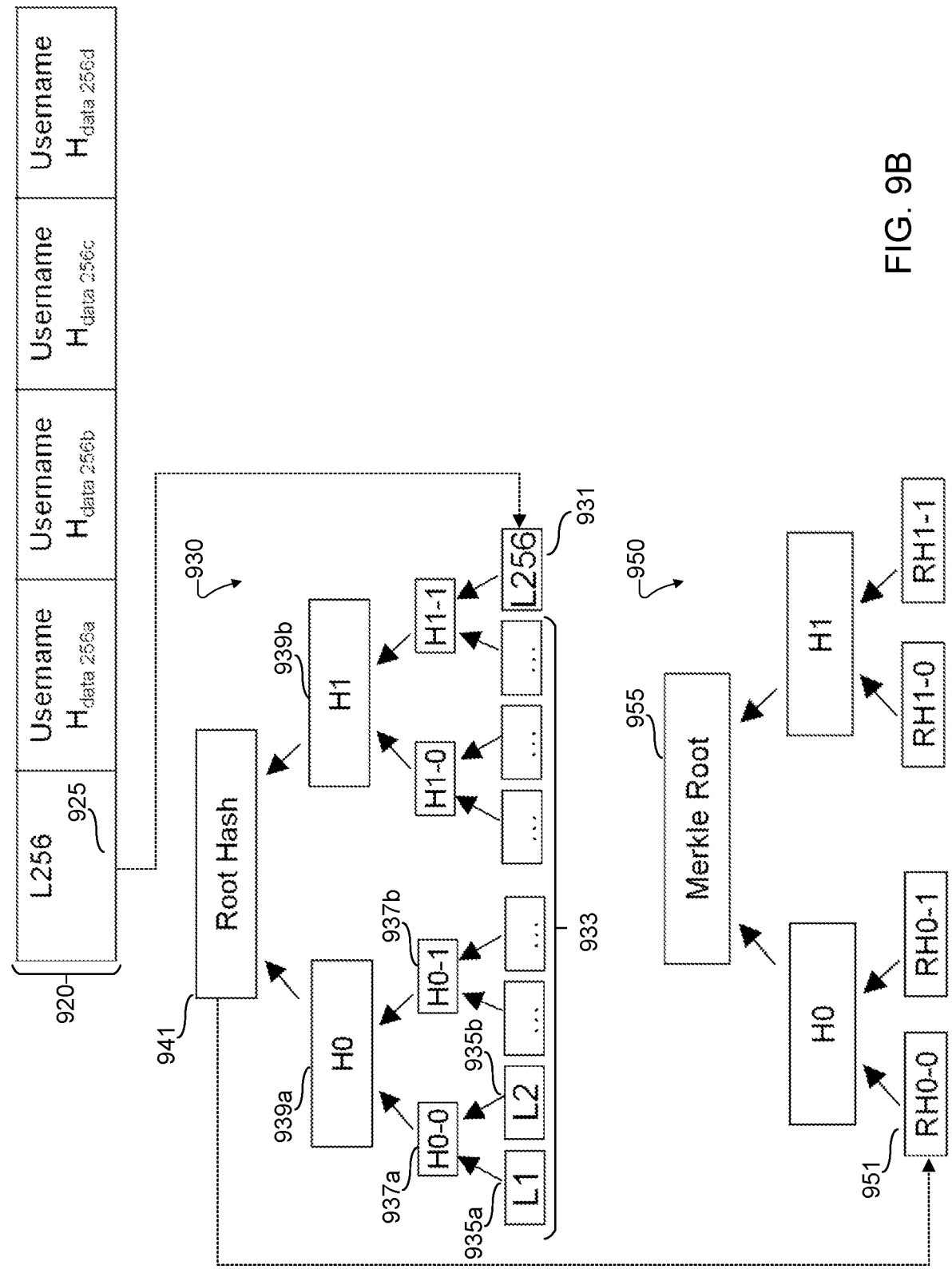

FIGS. 9A and 9B (collectively, "FIG. 9") illustrate an example of generating compact, secure representations of the user profile data maintained at each device of a shared device group, according to various embodiments of this disclosure. By generating compact, secure representations of the user profile data, electronic devices of the shared group (for example, shared group 700 in FIG. 7) can quickly determine whether their user profile databases are synchronized, and if not, can rapidly identify out-of-sync data, and perform targeted updates of only the out-of-sync data. For convenience of cross reference, elements common to both FIGS. 9A & 9B are numbered similarly.

Referring to the illustrative example of FIG. 9A, each device of a shared device group has an instance (for example, first instance 705a in FIG. 7) of a user profile database 901, wherein each instance of user profile database 901 comprises a plurality of user profiles (for example, user profile 905), wherein each registered user of the shared device group has (assuming full synchronization) a user profile in each instance of user profile database 901.

As shown in the explanatory example of FIG. 9A, each user profile 905 comprises an identifier 910 of the user associated with user profile 905. According to some embodiments, identifier 910 comprises a unique screen name used by the user, a randomly generated alphanumeric string, or some other unique datum not shared by any other user. Additionally, user profile 905 may comprise one or more timestamp values 911a recording the time at which a synchronization operation was last performed, as well as timestamps (for example, date/time created or modified) associated with other data fields maintained in user profile 905. In this way, where two devices have different instances of user profile 905, they can determine which device has the most recent version of the user profile data, and which device needs to receive an update.

In some embodiments, user profile 905 comprises biometric data 911b, such as an encrypted (for example, with the group key of the shared device group) facial authentication data of the user, or encrypted fingerprint authentication data. Additionally, user profile 905 further comprises an application identifier 911c, specifying the applications available to the user, as well as a set of credentials 911d for the applications specified by application identifier 911c. In this way, when a user logs into a synchronized device of the shared device group, the device can provide a user experience analogous to the device being the user's "home" device, wherein the user's preferred apps are presented at the device and the user is already logged in.

Referring to the non-limiting example of FIG. 9A, at each device of the shared device group, a hash table 915 is generated from the user profiles (for example, user profile 905) comprising the instance of user profile database 901 at the device. As shown in FIG. 9A, hashes of each field of each user profile are calculated and used to populate hash table 915. In this example, the data of each user profile forms a branch of the hash table, such that each branch occupies a row of hash table 915. In this example, hashes of each data field of user profile 905 populate the row 920. For example, time stamp 911a is represented in hash table 915 as hash 921a. Similarly, in this explanatory example, biometric data 911b is represented in hash table 915 as hash 921b, application identifier 911c is represented as 921c, and credentials 911d are represented as hash 921d. While the data in user profile 905 may be large and comprise one or more large files, by its nature, hash table 915 is typically smaller than the files of user profile 905, and comprises a set of alphanumeric nonces, from which no sensitive data can be recovered.

Further, for each row of hash table 915, a branch hash, comprising a hash of the constituent hashes of the branch is calculated. Thus, in this example, a branch hash 925 of hashes 921a-921d is calculated. When a user's profile data changes (for example, by logging off, adding an application, or otherwise adding, deleting or changing data stored in user profile 905, hash table 915 is recalculated or otherwise updated. While FIG. 9A has been described with reference to embodiments in which all of the user profile data is maintained in a single hash table 915, embodiments according to this disclosure are not so limited, as the processes of constructing hash tables and profile tree described with reference to FIG. 9 are scalable and master trees based on multiple hash tables are possible and within the contemplated scope of this disclosure.

Turning to the non-limiting example of FIG. 9B, one or more profile trees comprising a hierarchical set of hash nodes are constructed from one or more hash tables of the data of a user profile data base. In this explanatory example, the branch hashes of hash table 915 become the leaf nodes of one or more profile trees 930. For example, branch hash 925, which is a hash of the hashes forming row 920 of hash table 915 becomes a leaf 931 of the Merkle tree comprising profile tree 930. The remaining leaf nodes 933 are formed from the remaining branch hashes of hash table 915.

According to certain embodiments, profile tree 930 is a binary hash tree (also referred to as a Merkle tree) constructed by iteratively calculating hashes of node pairs until a single hash comprising a unique representation of the current data of the user profile database 901 is obtained. As shown in the explanatory example of FIG. 9B, node 937*a* is a hash computed from leaf nodes 935*a* and 935*b*, while node 939*a* is a hash computed from nodes 937*a* and 937*b*. Similarly, a root hash 941 is a hash calculated from the hashes at nodes 939*a* and 939*b*.

Profile tree 930 provides a compact data structure (i.e., hashes are short alphanumeric strings whose size is generally independent of the data from which the hash is calculated) from which determinations of whether two instances of a user profile database are in sync with one another. For example, consider the case of a first profile tree representing the current user profile data at a first instance of a database and a second profile tree representing the current user profile data at a second instance of the database. If the data in both instances of the database are identical (i.e., they are fully synched), that the two databases are synchronized can be quickly confirmed by determining (for example, by using a "==" function in Python) that the values of root hash 941 (i.e., the Merkle root of profile tree 930) are the same for both profile trees. Similarly, where only one user profile is different across the two instances of the database (for example, leaf node 935*a* is different in the two profile trees), the unsynchronized data can be quickly located by a series of comparisons of node pairs between the root hash. For example, if profile tree 930 comprises 256 leaf nodes, and a single leaf node is unsynchronized with a second instance of profile tree 930, the unsynchronized leaf node can be identified within eight (8) node comparisons. As such, profile trees (for example, profile tree 930) according to various embodiments of this disclosure provide a compact data structure that facilitates fast, computationally lightweight synchronization of user profile data across instances of user profile databases.

Further, while FIG. 9 has heretofore been described with reference to the data in the user database being represented in a single hash table, embodiments according to the present disclosure are not so limited. In some embodiments, where user profile database 901 is too large to be represented in a single hash table, its contents can be split across multiple hash tables, from which multiple profile trees can be constructed. According to various embodiments, a "profile tree of profile trees" can be created, wherein the leaf nodes comprise root hashes of the profile trees (profile tree 930) generated from the constituent hash tables. For example, in embodiments where profile tree 930 is one of a plurality of profile trees generated based on the current contents of a user profile database, root hash 941 can be used as a leaf node 951 of a new profile tree 950, built upon concatenated hashes over the root hashes of the other profile trees generated from the user profile data, resulting in a "master" root identifier 955.

Figure 10A:
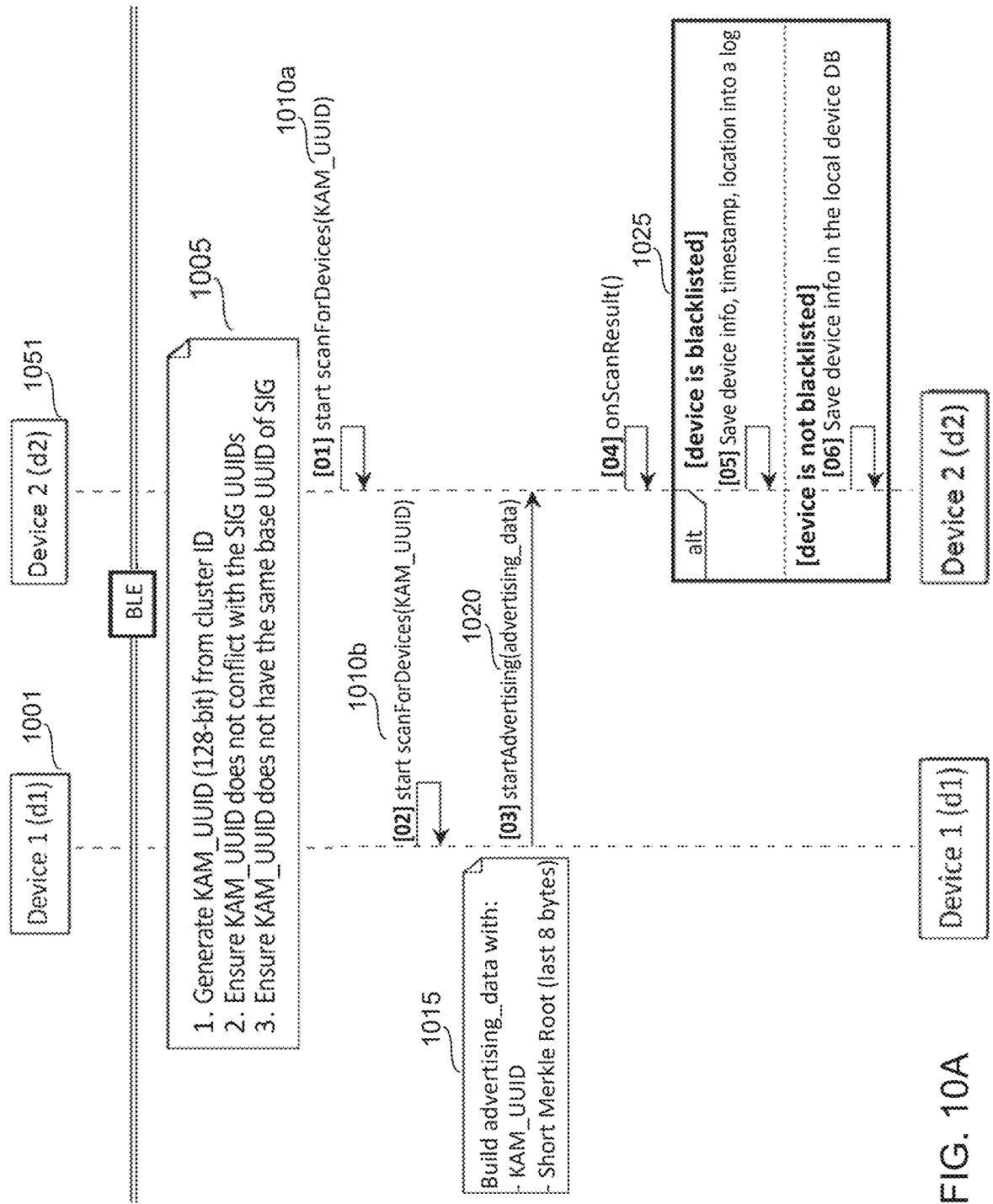
FIGS. 10A and 10B illustrate an example of signaling for detecting peer devices of a shared device group and synchronizing user profile data across devices of a shared device access group, according to various embodiments of this disclosure.
Figure 10B:
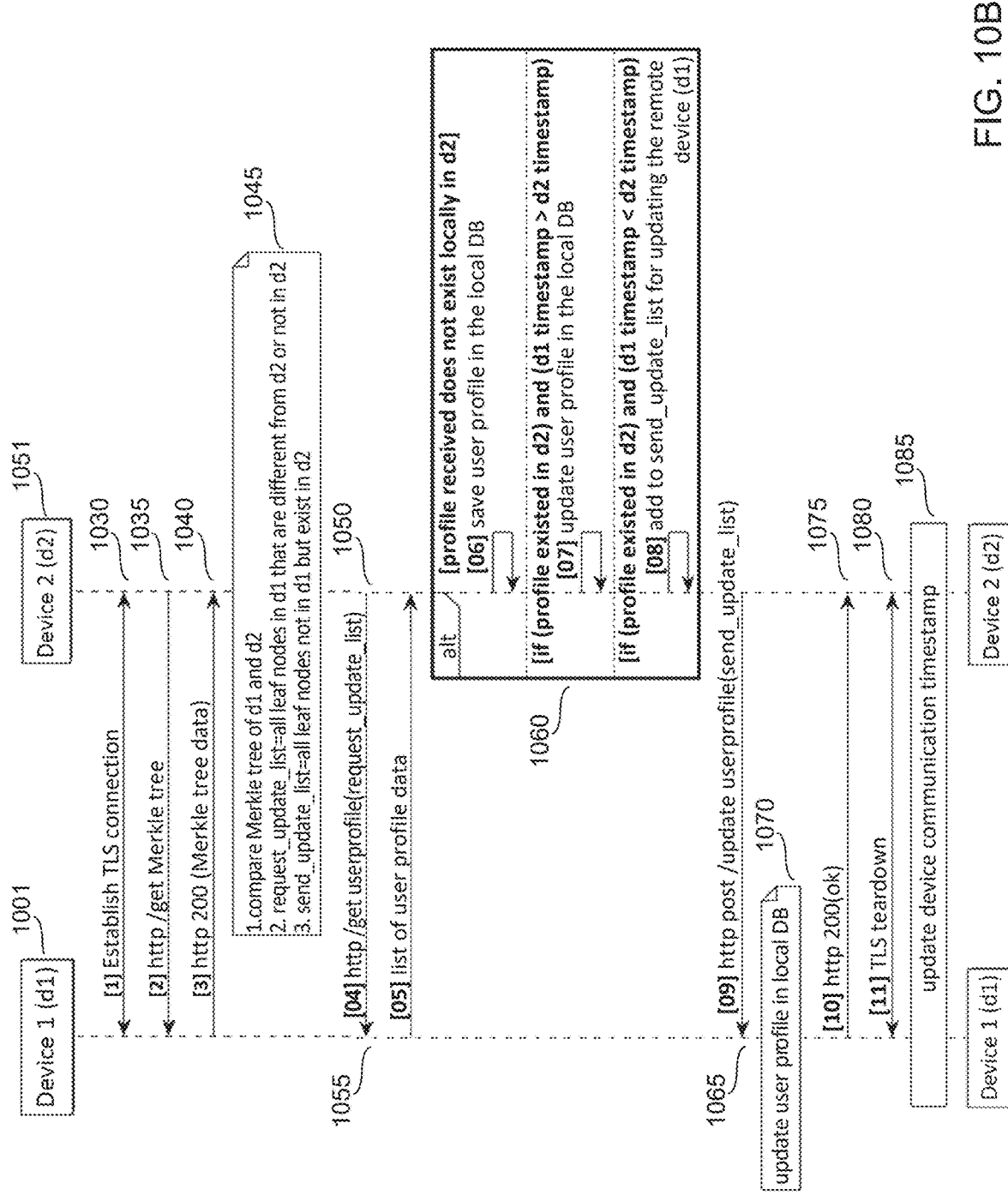

FIG. 10A illustrates an example of signaling for discovering peer devices of a shared device group (for example, shared device group (for example, shared device group 700 in FIG. 7) according to various embodiments of this disclosure. Elements common to both of FIG. 10A and FIG. 10B are numbered similarly.

Referring to the non-limiting example of FIG. 10A, two electronic devices (for example, instances of device 100 in FIG. 1), first device 1001 and second device 1051, executing instances of a shared device access control application (for example, SDAC 451 in FIG. 4) are shown in the figure. In this example, first device 1001 and second device 1051 are connected by via Bluetooth Low Energy (BLE), though other communication protocols are possible and within the contemplated scope of this disclosure.

At operation 1005, both first device 1001 and second device 1051 generate a unique user identifier ("UUID") based on a cluster ID, wherein a cluster ID is an identifier of a shared device group (for example, the identifier provisioned on each device at operation 610 in FIG. 6). According to various embodiments, control logic at the SDAC on each device selects a UUID value which is programmatically assured to be unique, but at the same time, providing reliable indicia of the transmitting device's membership in the shared device group.

According to various embodiments, at operations 1010*a* and 1010*b*, both first device 1001 and second device 1051 begin scanning for devices belonging to the shared device group. In this example, scanning for devices comprises receiving messages containing data advertising a device's membership in the shared device group.

As shown in the explanatory example of FIG. 10A, at operation 1050, first device 1001 generates advertising data for peer device detection, wherein the advertising data comprises the UUID for first device 1001 generated at operation 1005, and an identifier of the root hash (i.e., the Merkle root) of the profile tree (for example, root hash 941 or where the user database is too large to be contained in a single hash table, root hash 955, in FIG. 9). In certain embodiments, the identifier of the root hash comprises a truncated version (for example, the last 8 bytes) of the Merkle root of the profile tree representing the instance of the user profile database at first device 1001. At operation 1010, first device 1001 broadcasts the advertising message across the service area (for example, a radius of >100 meters, for BLE), wherein the advertising message comprises the advertising data generated at operation 1015. As shown in FIG. 10A, at operation 1025, the advertising message sent by first device 1001 is received by second device 1051 and the advertising data is analyzed to determine if first device 1001 is a peer device of the shared group in good standing. In some embodiments, at operation 1025, the UUID of first device 1001 is compared against entries of a blocked list (alternately referred to as a "blacklist.") Where device 1001's UUID matches an entry of the blocked list, the first device's information, such as its UUID, a timestamp and location information are saved to an alert log, which may periodically be reported to an administrator (for example, administrator platform 501 in FIG. 5). Where first device 1001's information does not correspond to any entries on a blocked list maintained at second device 1051, second device 1051 updates a local database of active devices of the shared device group to include first device 1001. Depending on embodiments, the frequency with which first device 1001 transmits advertising messages varies. In some embodiments, it transmits messages (such as the message transmitted at operation 1020) regularly, such as at 8-10 second intervals, to ensure that the user profile database is fully synchronized. In some embodiments, the frequency with which first device 1001 transmits advertising messages is a tunable parameter, which can be set by a process executing at first device 1001 (for example, performance optimizer 459 in FIG. 4). Alternately or additionally, the frequency with which first device 1001 transmits advertising messages is a parameter which can be set remotely, such as at a remote management console (for example, remote management console 501 in FIG. 5). The above-described embodiments for peer device detection provide a number of technical benefits, including, without limitation, reduced power consumption by sending truncated versions of a root hash, avoiding network congestion by using shorter advertisement messages, and enhancing the overall security of the shared device group by logging activity from device on a blocked list.

FIG. 10B illustrates an example of synchronization signaling between first device 1001 and second device 1051. In certain embodiments, the operations described with reference to FIG. 10B may be performed subsequent to first device 1001 and second device 1051 detecting each other (for example, via the signaling described with reference to FIG. 10A) and confirming that neither device is on a blocked list.

Referring to the illustrative example of FIG. 10B, at operation 1030, first device 1001 and second device 1051 establish a trusted connection. In various embodiments, establishing a trusted connection comprises exchanging messages encrypted with the group key of the shared device group (for example, the group key exchanged at operation 660 in FIG. 6). Because the group key of the shared device group is, by design, only accessible to devices of the shared group, where first device 1001 and second device 1051 are able, at operation 1030 to exchange and decrypt messages encrypted with a common group key, a trusted connection based on messages encrypted with the group key is formed.

As shown in FIG. 10B, at operation 1035, second device 1051 sends a call to first device 1001 asking first device 1001 to send the profile tree representing the current user profile data in the instance of the user profile database (for example, database 901 in FIG. 9A) at first device 1001. At operation 1040, first device 1001 sends profile tree data to second device 1051. In instances where the number of user profiles exceeds the number of rows permitted by the hash tables used, and multiple hash tables are generated from the user profile data, at operation 1040 first device 1001 may send a master tree (for example, profile tree 950 in FIG. 9, as well as the profile trees (for example, profile tree 930) whose root hashes were used to generate the master tree).

Referring to the illustrative example of FIG. 10B, at operation 1045, second device 1051 compares the profile tree data received from first device 1001 at operation 1040 against a corresponding profile tree maintained at second device 1051 to identify out-of-sync data. According to various embodiments, second device 1051 performs the comparison of the profile trees as a top-down traversal of the trees, starting with each profile tree's root. If the two profile trees' roots match, then no further comparison is necessary, as the data across both devices' instances of a user profile database is consistent and does not need synchronization. If however, the root hashes do not match (for example, if instances of root hash 941 in FIG. 9B do not correspond), then a comparison is performed at the next-highest level (for example, between instances of node 939*a* and 939*b* in FIG. 9B). The comparison is iterated across branches of the profile tree where mismatches between nodes continue to be found, but not across branches of the profile tree where the higher-level nodes correspond. In this way, embodiments according to this disclosure are able to efficiently identify leaf nodes which are out of sync, and importantly, not consume processing resources comparing leaf nodes shown to be identical by a match between instances of a higher-level node.

Based on the comparison performed at operation 1045, second device 1051 may generate a "request_update_list" specifying leaf nodes associated with user profile data maintained at first device 1001 which is either not present at second device 1051, or which differs from the counterpart instance of the same user profile at second device 1051. Additionally, based on the comparison performed at operation 1045, second device 1051 may generate a "send_update_list" specifying leaf nodes associated with user profile data maintained at second device 1051, for which there is no counterpart node at first device 1001. Depending on baseline level of synchronization between first device 1001 and second device 1051, generating a "send_update_list" may not be required, as the two instances of the user profile database may have the same leaf nodes, but with one instance of the database having more recent data in one or more leaf nodes.

At operation 1050, second device 1051 posts a message to first device 1001, requesting the user profile data specified by the "request_update_list." In response to receiving the message, first device 1001 encrypts the user profile data specified by the "request_update_list" and sends it to second device 1051 at operation 1055.

Referring to the illustrative example of FIG. 10B, at operation 1060, second device 1051 receives and decrypts the user profile data from first device 1001 and updates the instance of the user profile database maintained at second device 1051 by determining, for each user profile in the received user data, which of the following categories the user profile falls into. For user profiles do not exist in the user database at second device 1051, these user profiles are incorporated into the instance of the user profile database at second device 1051. For user profiles which already exist in the user profile database at second device 1051, and for which the received user profile data has a more recent time stamp, the received user profile data is merged into the instance of the user profile database at second device 1051. Alternatively, for user profiles which already exist in the user profile database at second device 1051, and for which the received user profile data has an older time stamp, the "send_update_list" is updated to include the profile which is out-of-date at first device 1001. According to various embodiments, at the end of operation 1060, second device 1051 recalculates the profile tree for the updated user database. At operation 1065, second device 1051 encrypts the user profiles specified by the "send_update_list" with the group key of the shared device group and sends same to first device 1001. According to various embodiments, at operation 1070, in response to receiving the user profile data comprising user profile data of the out-of-sync user profiles maintained at first device 1001, first device 1001 performs an update operation, wherein user profiles present at second device 1051 are added to the instance of the user profile database maintained at first device 1001, and user profiles for which second device 1051 has the more recent timestamp data are updated to synchronize with those of second device 1051.

In certain embodiments, at operation 1075, first device 1001 sends a message confirming that its database was successful, and at operation 1080, the devices break off the secure communication session. At operation 1085, both devices update the timestamp data of their instances of the user profile data and recalculate the profile tree of the user profile data in preparation for the next synchronization operation. While the signaling shown in FIGS. 10A and 10B is described with reference to a case in which two devices are synchronizing with one another, embodiments according to this disclosure are not so limited, and the processes of exchanging roots of local instances of a profile tree, performing top-down comparisons of profile trees and selectively updating only out-of-sync records are scalable and can be performed among three or more devices of a shared device group. Put differently, the present disclosure does not require that synchronization be carried in a binary fashion between two devices at a time.

FIG. 11 illustrates operations of an example method 1100 for performing synchronization of shared device access controls according to various embodiments of this disclosure. The operations described with reference to FIG. 11 can be performed on any suitably configured networked device (for example, device 100 in FIG. 1, a device implementing architecture 400 in FIG. 4, or first device 1001 in FIGS. 10A and 10B). While the example of FIG. 11 is described with reference to embodiments in which two devices are synchronized to one another, there is no requirement that method 1100 is limited to synchronization of only two devices.

Referring to the non-limiting example of FIG. 11, at operation 1105, an electronic device receives, from a second electronic device of a shared device group both devices belong, a second root identifier. According to some embodiments, the second root identifier is a shortened version of a root hash (for example, the shortened version of the root hash included in the advertising data generated at operation 1015 in FIG. 10A) of the profile tree comprising a representation of the user profiles currently maintained at the second electronic device. In certain embodiments, the second root identifier may be the full root hash of the profile tree. In some embodiments, the second root identifier is provided with the full profile tree of the second electronic device. As discussed in this disclosure, profile trees provide a compact representation of the underlying user profile data, and embodiments according to this disclosure afford significant flexibility with regard to how much profile tree data electronic devices exchange before performing top-down comparisons of profile trees.

According to various embodiments, at operation 1110, the electronic device determines that the received second root identifier does not match a first root identifier comprising a representation of a plurality of user profiles currently maintained at the electronic device. In other words, the user profile data at the electronic device does not perfectly correspond to the user profile data at the second electronic device, and the process of identifying and synchronizing the user profile data so that both electronic devices have the most recent instances of the user profile data is initiated.

At operation 1115, the electronic device sends a profile tree (for example, profile tree 930 in FIG. 9A) to the second device. In some embodiments, for example, embodiments where the number of user profiles exceeds the capacity of a single hash tree, a "master profile tree" built from the root hashes of other profile trees, as well as the source profile trees used to construct the master profile tree are sent at operation 1115.

According to various embodiments, at operation 1120, the electronic device receives, from the second electronic device, user profile update information. In this illustrative example, the user profile update information received at operation 1120 is based on a comparison of profile trees at the second device (for example, the comparison performed at operation 1060 of FIG. 10B, wherein the second device performs, at a minimum, a comparison to identify, based on hash values in the first and second devices' profile trees, mismatches between leaf nodes of the profile tree(s) maintained at the second device and the profile tree(s) received from the electronic device at operation 1115.

As shown in the explanatory example of FIG. 11, at operation 1125, the electronic device updates a subset of the plurality of user profiles maintained in the instance of the user profile database at the electronic device. The subset of user profiles which are updated includes the user profiles for which the leaf nodes of the profile trees at the electronic device and second electronic device do not comprises. According to various embodiments, updating a user profile may be performed by at least one of: adding a user profile to a local instance of a user profile database, merging a user profile to a local instance of a user profile database based on a comparison of timestamp data, or adding a user profile to a "send update" list based on a comparison of timestamp data.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps. None of the description in this application should be read as implying that any particular element, step, or function is an essential element that must be included in the claim scope.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method, comprising:
    receiving, at a first electronic device associated with a first root identifier, a second root identifier from a second electronic device, wherein the first root identifier is based on a first profile tree maintained at the first electronic device, and wherein the second root identifier is associated with a second profile tree maintained at the second electronic device;
    determining that the first root identifier does not match the second root identifier;
    sending, to the second electronic device, the first profile tree, wherein the first profile tree comprises a representation of currently-maintained user profiles at the first electronic device;
    receiving, from the second electronic device, user profile update information, wherein the user profile update information corresponds to user profile information maintained at the second electronic device and determined to be more recent than corresponding user profile information at the first electronic device; and
    updating a subset of the currently-maintained user profiles based on the user profile update information.

2. The method of claim 1, further comprising:
responsive to updating the subset of the currently-maintained user profiles, updating the first profile tree; and
generating an updated first root identifier based on the updated first profile tree.

3. The method of claim 1, wherein the first profile tree comprises a Merkle tree generated from one or more hash tables of user profile data.

4. The method of claim 3, wherein the first root identifier comprises a Merkle root of the first profile tree.

5. The method of claim 1, further comprising:
detecting the second electronic device;
authenticating the second electronic device as a peer device of a shared device group; and
establishing a trusted connection with the second electronic device.

6. The method of claim 5, wherein detecting the second electronic device comprises:
receiving an advertising message from the second electronic device,
wherein the advertising message comprises an identifier of the shared device group and at least a portion of the second root identifier.

7. The method of claim 5, wherein establishing the trusted connection with the second electronic device comprises:
receiving, from the second electronic device, a group key for the shared device group; and
confirming that the group key for the shared device group received from the second electronic device matches a group key for the shared device group maintained at the first electronic device.

8. The method of claim 7, further comprising:
responsive to confirming that the group key for the shared device group received from the second electronic device matches the group key for the shared device group maintained at the first electronic device, decrypting a biometric authentication profile for a user with the group key;
receiving, through a biometric sensor of the first electronic device, biometric information of the user;
authenticating the user by comparing the biometric information of the user against the biometric authentication profile for the user; and
sending a logoff message for the user to the second electronic device.

9. The method of claim 1, further comprising:
receiving, at the first electronic device from a third electronic device, a third root identifier, wherein the third root identifier is associated with a third profile tree maintained at the third electronic device;
determining that the first root identifier does not match the third root identifier;
sending, to the third electronic device, the first profile tree;
receiving, from the third electronic device, second user profile update information; and
updating a second subset of the currently-maintained user profiles at the first electronic device based on the second user profile update information.

10. The method of claim 1, further comprising:
subsequent to updating the subset of the currently-maintained user profiles based on the user profile update information, sending a report to a remote management console, wherein the report comprises at least one of per-profile metadata of the currently-maintained user profiles or per-device metadata based on the currently-maintained user profiles.

11. An electronic device associated with a first root identifier, the first root identifier based on a first profile tree maintained at the electronic device, the electronic device comprising:
at least one communication interface; and
at least one processor configured to:
receive, via the at least one communication interface, a second root identifier from a second electronic device, wherein the second root identifier is associated with a second profile tree maintained at the second electronic device,
determine that the first root identifier does not match the second root identifier,
send, to the second electronic device, the first profile tree, wherein the first profile tree comprises a representation of currently-maintained user profiles at the electronic device,
receive, from the second electronic device, user profile update information, wherein the user profile update information corresponds to user profile information maintained at the second electronic device and determined to be more recent than corresponding user profile information at the electronic device; and
update a subset of the currently-maintained user profiles based on the user profile update information.

12. The electronic device of claim 11, wherein the at least one processor is further configured to:
responsive to updating the subset of the currently-maintained user profiles, update the first profile tree, and
generate an updated first root identifier based on the updated first profile tree.

13. The electronic device of claim 11, wherein the first profile tree comprises a Merkle tree generated from one or more hash tables of user profile data.

14. The electronic device of claim 13, wherein the first root identifier comprises a Merkle root of the first profile tree.

15. The electronic device of claim 11, wherein the at least one processor is further configured to:
detect the second electronic device,
authenticate the second electronic device as a peer device of a shared device group, and
establish a trusted connection with the second electronic device.

16. The electronic device of claim 15, wherein:
to detect the second electronic device, the at least one processor is configured to receive an advertising message from the second electronic device, and
the advertising message comprises an identifier of the shared device group and at least a portion of the second root identifier.

17. The electronic device of claim 16, wherein, to establish the trusted connection with the second electronic device, the at least one processor is configured to:
receive, from the second electronic device, a group key for the shared device group, and
confirm that the group key for the shared device group received from the second electronic device matches a group key for the shared device group maintained at the electronic device.

18. The electronic device of claim 17, wherein the at least one processor is further configured to:
responsive to confirming that the group key for the shared device group received from the second electronic device matches the group key for the shared device group maintained at the electronic device, decrypt a biometric authentication profile for a user with the group key, receive, through a biometric sensor of the electronic device, biometric information of the user, authenticate the user by comparing the biometric information of the user against the biometric authentication profile for the user, and send a logoff message for the user to the second electronic device via the at least one communication interface.

19. The electronic device of claim 11, wherein the at least one processor is further configured to:

receive, via the at least one communication interface from a third electronic device, a third root identifier, wherein the third root identifier is associated with a third profile tree maintained at the third electronic device, determine that the first root identifier does not match the third root identifier, send, to the third electronic device, the first profile tree, receive, from the third electronic device, second user profile update information, and update a second subset of the currently-maintained user profiles at the electronic device based on the second user profile update information.

20. The electronic device of claim 11, wherein the at least one processor is further configured to:

subsequent to updating the subset of the currently-maintained user profiles based on the user profile update information, send a report to a remote management console, wherein the report comprises at least one of per-profile metadata of the currently-maintained user profiles or per-device metadata based on the currently-maintained user profiles.

* * * * *